United States Patent [19]

Frederick

[11] Patent Number: 5,757,424
[45] Date of Patent: May 26, 1998

[54] HIGH-RESOLUTION VIDEO CONFERENCING SYSTEM

[75] Inventor: Ronald A. Frederick, Mountain View, Calif.

[73] Assignee: Xerox Corporation, Stamford, Conn.

[21] Appl. No.: 574,706

[22] Filed: Dec. 19, 1995

[51] Int. Cl.[6] .................................... H04N 5/225
[52] U.S. Cl. ............................... 348/218; 348/17
[58] Field of Search .................... 348/218, 15, 214, 348/19, 159, 143, 17, 584, 586, 154, 588; 386/46, 117, 38

[56] References Cited

U.S. PATENT DOCUMENTS

| | | | |
|---|---|---|---|
| 4,028,725 | 6/1977 | Lewis | 348/115 |
| 4,400,724 | 8/1983 | Fields | 348/15 |
| 4,935,953 | 6/1990 | Appel et al. | 379/53 |
| 5,005,083 | 4/1991 | Grage et al. | 348/588 |
| 5,008,747 | 4/1991 | Carr et al. | 358/136 |
| 5,016,109 | 5/1991 | Gaylord | 348/218 |
| 5,121,202 | 6/1992 | Tanoi | 358/136 |
| 5,130,794 | 7/1992 | Ritchey | 348/39 |
| 5,142,362 | 8/1992 | Masera et al. | 358/133 |
| 5,193,004 | 3/1993 | Wang et al. | 358/136 |
| 5,206,721 | 4/1993 | Ashida et al. | 348/15 |
| 5,329,313 | 7/1994 | Keith | 348/422 |
| 5,359,362 | 10/1994 | Lewis et al. | 348/15 |
| 5,374,971 | 12/1994 | Clapp et al. | 354/293 |
| 5,499,051 | 3/1996 | Suda et al. | 348/218 |
| 5,568,192 | 10/1996 | Hannah | 348/222 |
| 5,572,248 | 11/1996 | Allen et al. | 348/15 |
| 5,625,410 | 4/1997 | Washino et al. | 348/154 |
| 5,686,957 | 11/1997 | Baker | 348/15 |
| 5,689,614 | 11/1997 | Ludwig et al. | 348/15 |

*Primary Examiner*—Andrew Faile
*Assistant Examiner*—Aung S. Moe
*Attorney, Agent, or Firm*—R. Hutter

[57] ABSTRACT

A system enables high-resolution videoconferencing images to be transmitted, without extreme demands on bandwidth. A mosaicing camera sequentially samples a series of small portions of a general scene, and a composite image of the entire general scene is transmitted. Simultaneously, an individual small area of the general scene where high time resolution is desirable is sampled at a high time resolution by a dedicated camera. The high-time-resolution images are then patched into the composite image.

19 Claims, 3 Drawing Sheets

HIGH-RESOLUTION VIDEO CONFERENCING SYSTEM

INCORPORATION BY REFERENCE

The present application incorporates by reference co-pending U.S. patent application Ser. No. 08/146,761, filed Nov. 2, 1993, entitled "Software Video Compression for Teleconferencing," and U.S. patent application Ser. No. 08/303,918, filed Sep. 9, 1994, entitled "Device for Transcribing Images on a Board Using a Camera Based Board Scanner," both assigned to the assignee hereof.

FIELD OF THE INVENTION

The present invention is directed to videoconferencing systems, and specifically to a videoconferencing system that can transmit different portions of an image separately, in order to communicate meaningful visual information at higher resolution than is possible with standard video cameras and digitizers.

BACKGROUND OF THE INVENTION

Videoconferencing systems, meaning systems allowing video images to be exchanged in real time among a small number of parties, are well-known. Current videoconferencing systems use digital data to transmit images. Digitally-based images can be manipulated as desired, such as by placing an image in a small window occupying only a portion of a screen, in a larger software context. Digital transmission technology further enables tradeoffs between the pixel resolution of an image and the time resolution (i.e., the scan rate or frame rate) at which such images can be transmitted in real time.

A typical digital video capture of the output of a commercially-available NTSC camera is at a resolution of at most 640×480 pixels. Typical systems encode color data at sixteen bits per pixel uncompressed, so a typical data rate would be 600 KB per frame. Data rates at this range are currently impractical for transmission, and so the video data must be compressed to a pixel rate of one bit per pixel or less. Typically, such systems encode color differences at half the resolution of the greyscale, so each pair of pixels involves two 8-bit greyscale values, one 8-bit "red" difference, and one 8-bit "blue" difference. It is also common to reduce the vertical resolution by half, so each 2×2 block of pixels has only one color difference pair. In that case, each 640×480 frame takes up about 450 KB uncompressed. For analog-video quality images, there would typically be required twenty to thirty frames per second to be transmitted, and any noticeable "jerkiness" caused by too-low time resolution will occur at about ten frames per second. In many commerically-available videoconferencing systems, the spatial resolution of images as they are transmitted is only 320×240 pixels or less, as part of the tradeoff between resolution and frame rate.

In the most common contexts for videoconferencing, the images transmitted are typically very predictable: usually in the form of one or more "talking heads" whose appearance does not change significantly over time. The predictability of most videoconferencing images can thus be exploited for optimizing the tradeoff among time resolution, pixel resolution, and necessary bandwidth for transmitting the images. For example, one known technique is to identify only those pixels that have changed their signal values with each frame, and transmit only those pixel signals which have changed since a previous time period, letting other pixels (such as for a background) simply remain as they were. In this way, only the changes to the image since the last sampling are transmitted. Other "lossy compression" techniques are known to attain an increased compression ratio of signals being transmitted. Such compression techniques are discloses, for example, in the "JPEG Still Picture Compression Standard," which is known in the art.

In the prior art, U.S. Pat. No. 4,935,953 discloses a system in which a video image space is broken down into specific overlapping regions, with a portion of the image space requiring a high time resolution being placed in an area of overlap. The overlap enables an effective high rate of scanning of the overlap area, because the overlap area is refreshed every time one of its regions is refreshed.

U.S. Pat. No. 5,008,747 discloses a video system in which the current frame of the picture being shown is compared block-by-block with a previous frame to identify changed pixels. Once those pixels flagged as changing are transmitted.

U.S. Pat. No. 5,121,202 discloses a video communications system in which "motion vectors" of the scene being sampled are detected, and the motion of the scene is thereby predicted for a short time in the future. This prediction technique is used to save the number of frames that must be transmitted.

U.S. Pat. No. 5,142,362 discloses a system which recognizes still-picture portions of a video transmission and codes groups of pixels of a still-picture portion of the video.

U.S. Pat. No. 5,193,004 discloses a system whereby a subset of video fields are provided, and signals representative of interpolations of action between the sampled fields are derived.

U.S. Pat. No. 5,329,313 discloses a system whereby a bit stream representative of at least one digital video image is decoded in real time by providing a code-book index from the bit stream, applying the code-book index to an index table to determine an index value, and comparing the index value to a first predetermined threshold. Depending on the relationship between the index value and the threshold, the selection of the next pixel in the subsequent video image is calculated in various ways.

U.S. Pat. No. 5,359,362 discloses a videoconferencing system wherein two cameras are symmetrically positioned at each station on opposite sides of an optical axis between the speaker and the monitor used to produce an image of the listener. The two cameras are used to create a virtual image corresponding to the image that would be viewed by a camera located on the optical axis.

U.S. Pat. No. 5,374,971 discloses a camera stand for directing a video camera at, alternately, a speaker in a room and a document on a table, where the document is oriented to be read by the person seated in the scene.

SUMMARY OF THE INVENTION

According to the present invention, there is provided a method and apparatus for transmitting an image representing a scene in real time. A mosaicing camera samples at least a first portion and a second portion of the scene, and outputs a first mosaic image and a second mosaic image. Each of the first mosaic image and the second mosaic image comprises a set of pixels forming a coherent image. The first mosaic image and the second mosaic image are combined, whereby pixels from the first mosaic image abut pixels from the second mosaic image, to yield a coherent composite image.

A first specific camera samples a first specific portion of the scene, outputting a first specific image. The first specific image includes at least a portion of the scene sampled in the first mosaic image or the second mosaic image. Pixels from the first specific image are then substituted into the composite image, yielding a coherent final image.

DETAILED DESCRIPTION OF THE INVENTION

Figure 1:
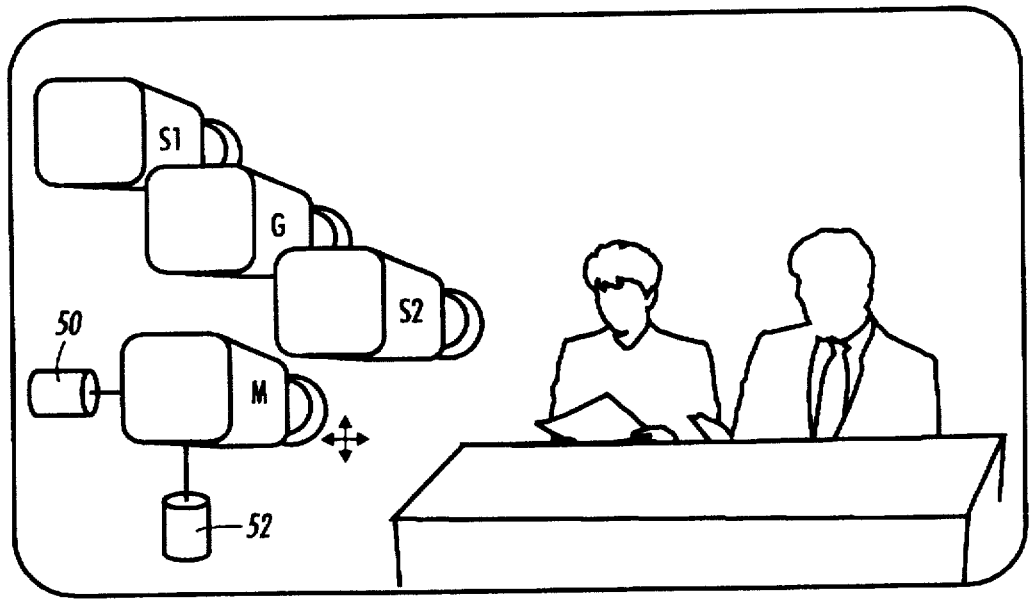
FIG. 1 is a perspective view showing a general configuration of a videoconferencing system in which the system of the present invention is useful.
Figure 2:
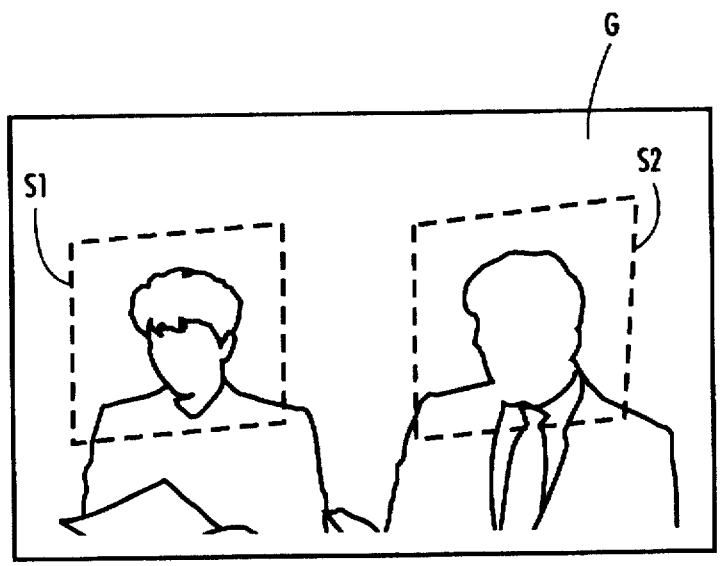
FIG. 2 is an example of the relationship of signals from a general camera and two specific cameras as shown in FIG. 1, in terms of positions of pixel signals relative to the scene being recorded.

FIG. 1 is a simplified perspective view showing an arrangement of cameras in a videoconferencing situation in which the system of the present invention may be employed. FIG. 2 shows a sample composite image as would be provided by the cameras shown in FIG. 1. (In the Figures, a letter indicating a type of camera is also used to indicate the view from that camera.) As can be seen, in a typical videoconferencing situation, one or more persons are typically seated at a table and generally do not move to any great extent during the course of the transmission; while the persons substantially stay in place, there will of course be motion of their faces and hands, and it is desirable to have a realistic coordination of, for example, facial movements with the simultaneous audio.

Comparing FIG. 1 with FIG. 2, it can be seen that there is a "general camera" indicated as G, which is focused on an entire scene, here the two persons. Further, there are also provided two "specific" cameras, a first specific camera S1 focused generally on one of the two persons, and a second specific camera S2, focused on the other person. It will be noticed, in FIG. 2, that the specific cameras are directed to portions of the general scene on which the general camera G is focused, so that, in general, the areas being sampled by specific cameras S1 and S2 are within the frame of general camera G's view of the scene.

Figure 3:
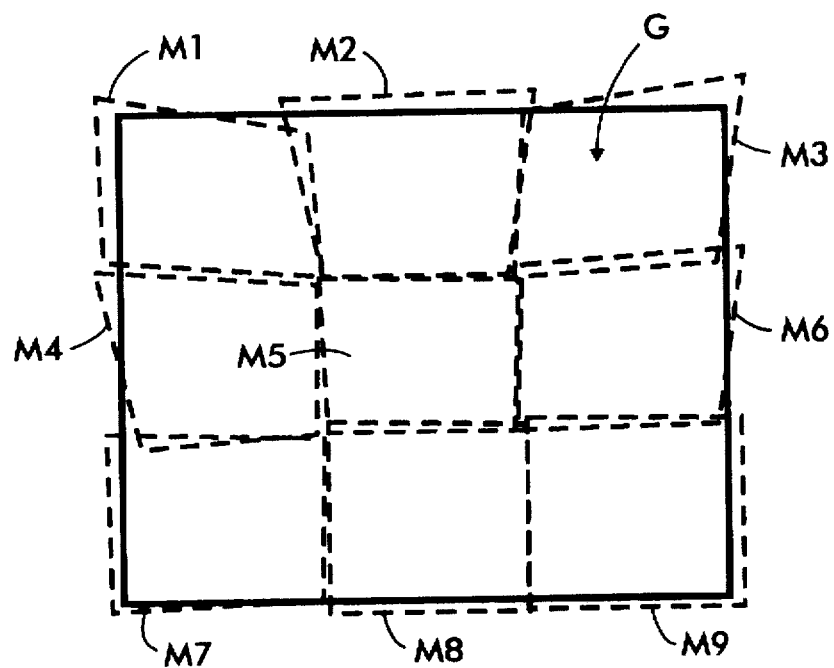
FIG. 3 is an example of the relative positions of screens created by a mosaicing camera, according to the present invention.

Also shown in FIG. 1, viewing the videoconferencing scene, is a "mosaicing" camera indicated as M. The purpose of mosaicing camera M is to sample individual small portions, or screens, of the whole general scene, such as viewed as general camera G, in sequence and then "mosaic" the individual small portions into a single coherent scene, or "composite image," which simulates the field of view shown by general camera G. An example of this "mosaicing" is shown in FIG. 3: the general view G is here divided into nine individual overlapping screens indicated as M1–M9. It will be apparent that the individual screens M1–M9 are in effect pictures that are "taken" by sequentially moving mosaicing camera M to each of nine distinct positions relative to the general view G. The advantage of this mosaicing technique is that the composite image from the nine screens M1–M9 will have a much higher total resolution than the general view G. The individual screens M1–M9 from mosaicing camera M are created by having pixels from one screen abut pixels from another screen in the composite image; preferably, adjacent screens overlap slightly, as shown, so that a relatively seamless total view of the general scene may be created.

Mosaicing camera M is controlled by motion-control hardware, such as shown in FIG. 1 as vertical camera 50 and horizontal camera 52. The motors are automatically controlled in such a manner that the mosaicing camera M sequentially samples the individual views corresponding to screens M1–M9 in a regular sequence, such as one view per second, so that the entire general view G is "refreshed" approximately once every nine seconds. If the mosaicing camera M is an off-the-shelf video camera with a typical resolution of 640×480 pixels, it will be apparent that the resulting mosaic image of the whole general scene will be available at a high spatial resolution (generally, in this example, nine times normal resolution) but at the expense of very slow time resolution (in effect, one new frame every nine seconds).

In a videoconferencing situation such as here illustrated, it will be apparent that, on the whole, the scene sampled by general camera G and rendered as a composite image by mosaicing camera M will remain fairly constant over time, and that most of the "action" over the course of time will take place on the faces of the persons of the scene. In a preferred embodiment of the present invention, each camera G, M, S1, or S2 is a video camera which outputs a set of pixel signals corresponding to the raster of image signals which, when assembled, form a coherent image. The rate at which sets of pixel signals forming a coherent image, or frames, are output by each camera corresponds to the "frame rate," or time resolution, of that particular camera. The higher the frame rate, the "smoother" the moving image will appear.

According to the present invention, this mosaic image being output from mosaic camera M, being of very high spatial resolution but low time resolution, is used to establish a background, which is assumed to be on the whole showing relatively little motion over time, on which the action recorded at a high frame rate by specific cameras S1 and S2 can be superimposed. The relatively high spatial resolution provided by the composite image from mosaicing camera M can thus receive "patches" of real-time samples of small areas of the general scene which are of interest over time, i.e., small portions of the total composite image, such as of a person's face, which will require high time resolution for a realistic rendering.

In the illustrated context, the background and area not near either of the persons will change slightly, if at all, from frame to frame, and the most important action will take place on and immediately around the images of the persons. Therefore, a system can be provided which samples the areas of most interest, particularly those areas on which specific cameras S1 and S2 are respectively focused, at a higher time resolution than the remainder of the image.

In a typical videoconferencing situation where there are multiple people in the general scene, it is apparent that very often only one of the persons in the general scene will be speaking at a given time. In such a case, it is possible to select one of the specific portions of the scene, such as shown by S1 or S2 in FIG. 2, and activate that portion of the general scene for substitution of pixel signals by a specific camera. Thus, when the person in portion S1 of the scene is not speaking but is sitting still, a system could select the camera focused on the speaking person in the scene to output signals at the high rate and substitute those high-rate sampled pixel signals into the general scene, while the person in the inactivated camera, who is sitting still, would become part of the general scene, and whose image would simply be scanned at the lower rate by mosaicing camera M. Of course, in situations where a person at the other end of the transmission is speaking, and neither person in the general scene is speaking, for those few seconds, the entire composite scene from mosaicing camera M could be transmitted by itself with no substitution of pixel signals from a specific camera.

As used in the claims herein, the composite image created by the mosaicing of screens from mosaicing camera M, as shown in FIG. 3, is the "composite" image; the composite image with pixels from a specific camera substitued therein is referred to as the "final" image.

According to a preferred embodiment of the present invention, each individual mosaic frame M1–M9 of the image and each specific scene such as from camera S1 or S2, is of the standard 640×480 pixel size. It should be noted that the aspect ratio of the transmitted scene can be freely selected; it may be desirable, for example, to have mosaicing camera M transmit a composite image of two screens in the vertical direction and three in the horizontal direction, as opposed to the 3×3 screens composite image shown in FIG. 3. Also, it is conceivable to have the portion of the scene sampled by a specific camera be in "portrait" (long-vertical) orientation, as opposed to the more common "landscape" orientation.

The present invention enables the transmission of videoconferencing images at a reasonably high spatial overall resolution, by using a combination of relatively inexpensive off-the-shelf video cameras and without unnecessarily taxing the bandwidth of the system. A relatively high spatial resolution, that is, considerably more than the standard 640×480 pixel frame provided by an inexpensive video camera, is desirable in situations where the videoconferencing scene is desired to be displayed on a relatively large CRT or flat-panel display. As can be seen, for example, in FIG. 3, the mosaicing technique carried out by mosaicing camera M can provide an overall view of a scene where there are three times as many pixels as usual along each linear dimension on the overall transmitted scene.

It will be noted in FIG. 2 that the areas into which the specific portions of the scene indicated as S1 and S2 are "patched" (that is, where their pixels are substituted for the pixels in the general scene) are in the shape of distorted rectangles. The reason these rectangles are somewhat distorted is that the specific cameras such as S1 and S2 will probably be in slightly different positions relative to the scene than the composite scene rendered by mosaicing camera M, such as shown in FIG. 1. A patch such as S1 or S2 in FIG. 2 is of a shape which is selected to compensate both for the positional and focal length differences between the two types of camera. Thus, while the patches look like distorted rectangles from the point of view of general camera G and mosaicing camera M, these distorted rectangles will be right rectangles from the points of view of the specific cameras S1, S2 themselves.

A "patch algorithm" can be calculated which determines the necessary shape and position of the patches such as S1 and S2 in FIG. 2 based on the detected relative positions and angles of the specific cameras to the general camera. An example of this technique of determining shapes for patches which are placed into larger images is given, for example, in co-pending U.S. patent application Ser. No. 08/303,918, filed Sep. 9, 1994, entitled "Device for Transcribing Images on a Board Using a Camera Based Board Scanner," incorporated by reference above. FIG. 3 of this referenced application gives an example of how the shape of a patch (called an "image tile" in the referenced application) has to be recalculated as the position of a camera diverges from a right angle to a plane of view.

It should be noted that each of the patches M1–M9 captured by the mosaicing camera M are already in the shape of distorted rectangles when they are fit together to form the initial background image. The patches coming from cameras S1 and S2 are not special in this regard. The algorithm used to integrate the specific images S1 and S2 into the final image is identical to the algorithm used to fit the patches M1–M9 together. The specific images S1 and S2 can be thought of as extra patches to be worked into the mosaic. The only difference is the specific images concentrate on a specific area of the image so that this area can be rendered with a high time resolution.

Figure 4:
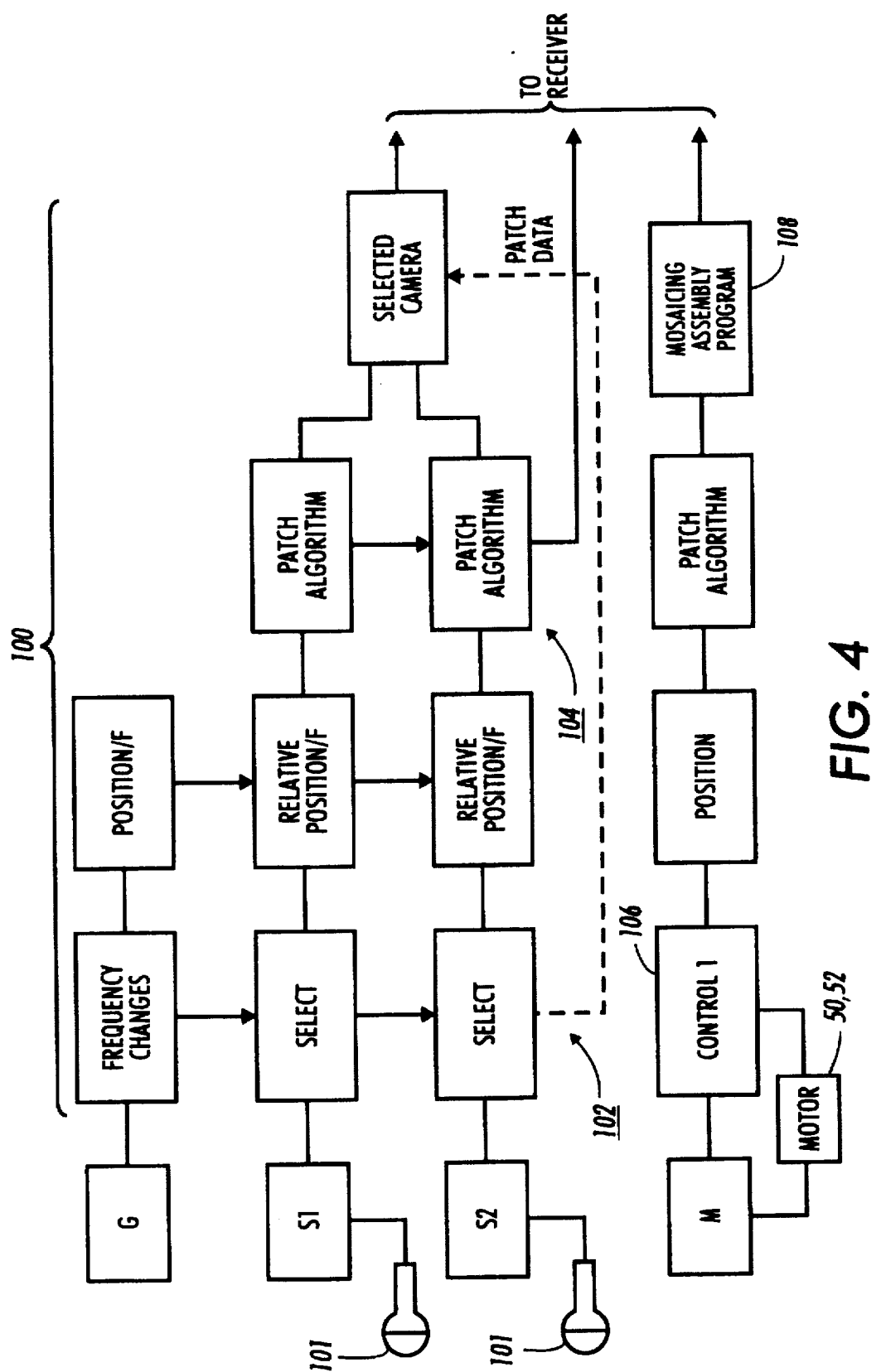
FIG. 4 is a systems diagram illustrating the interaction between pixel signal streams from a general camera and two specific cameras, according to one embodiment of the present invention.

FIG. 4 is a systems diagram of a transmitting station, indicated generally as 100, showing the relationship among control systems operative of the general camera G, and two specific cameras S1 and S2. The general diagram of FIG. 4 is intended to indicate a system which could operate under the control of a general-purpose computer, although other manifestations may be possible, if it is desired, for example, to place certain capabilities resident within specific video equipment, such as the cameras themselves. In FIG. 4, the horizontal lines indicate operations performed on the signal stream or other outputs from a camera, while vertical lines indicate interactions of control signals between cameras.

Starting with the output pixel signal streams of cameras G, S1, and S2, the first operation is to determine which of the specific cameras S1 or S2 should be substituting its pixels into the general view provided by general camera G. One possible technique for selecting a camera S1 or S2 is to examine frequency changes in the behavior of pixels in certain positions within the raster formed with each frame of the signal stream. Motion, such as of a person in one specific portion of the general scene, will create changes in pixel signal values for pixels in that particular position of the image, and these changes in pixel values from frame to frame can be detected as certain behaviors in the signal stream. These changes caused by motion of a person within the general scene can be used to identify where in the general scene the motion is taking place, and, if possible, can be used to select a specific camera, in this case either S1 or S2, for sampling the moving image. This means for determining frequency changes in the general camera pixel signals is indicated as 102.

Alternately, the determination of where in the general scene there is motion could be detected by other factors, such as through an audio signal. For example, if there are two people in the general scene, and each person is speaking into his own microphone, the presence of an audio signal from a particular microphone, such as shown as 101 in FIG. 4, can be used to indicate where the action of interest is in the general scene.

It will be seen that the main function of general camera G is to provide the system with an "overview" of where in the whole general scene motion of interest is occurring; when motion of interest is occurring at a certain place in the general scene viewed by general camera G, a specific camera such as S1 or S2 is activated for sampling and sending image data. However, what is sent to a recipient video conferencing station is not the general image from general camera G, but rather the mosaiced composite image of the general scene, such as shown in FIG. 3. Once again, this composite image is characterized by relatively high spatial resolution and relatively low time resolution. The images from the specific cameras S1 and S2 are intended to be of a significantly higher, and preferably "smooth" (greater than ten frames per second) time resolution. When the high time-resolution images from the specific cameras S1 or S2 are patched into the composite image from mosaic camera M, the desired overall result will be an image of high spatial resolution, with comparable spatial resolution in the specific areas, but with which the specific areas are of a higher time resolution than the balance of the transmitted image.

During the entire time of operation of the system, there is set forth a sequence of individual screens, such as M1–M9 in FIG. 3, from mosaicing camera M. As mentioned above, mosaicing camera M is positioned by automatic control to run through a sequence of different positions by which a series of small portions of the general scene G are sampled. This automatic, periodic repositioning of mosaicing camera M is performed by a control system which operates horizontal motor 50 and vertical motor 52, thereby aiming mosaicing camera M through a series of small areas of the general scene. A control system can take into account the operation of the motors 50–52 to determine the position of mosaicing camera M at any time, and thereby determine the location of a particular screen being sampled at any time, relative to the general image. According to another possible embodiment of the present invention, instead of having a single mosaicing camera M which is movable by a motion-control system, there could be provided an array of two or more stationary mosaicing cameras, each camera sampling an individual screen at a slow rate. Thus, the function of a single mosaicing camera M can be apportioned among a number of stationary cameras; it will be apparent that such an array of stationary or partially-moving cameras is an equivalent of a single mosaicing camera as shown in the illustrated embodiment. As can be seen in FIG. 4, there is an interaction between the control system, indicated as 106, which controls the motors 50–52 which aim mosaicing camera M, and the necessary patch algorithm created by any individual position of mosaicing camera M. Thus, every time mosaicing camera M moves to a predetermined position to sample one screen M1–M9, the position of the camera M is taken into account, and this position of the camera at any given time is used to determine the patch algorithm by which the composite image may be created. The combination of sampled images and patch algorithms can then be used in a mosaicing assembly program, indicated as 108.

As mentioned above, once a specific camera S1 or S2 is selected for the substitution of pixels, this substitution of pixels will be in the form of a "patch" where the pixel signals from the specific camera will be substituted into those of the composite image. In order to determine the shape of the patch, however, the relative position of the selected specific camera must be determined relative to the general camera. It is possible, given a frame of reference for the position, angle, and focal length of the selected specific camera, to calculate the dimensions of the patch shape for the substituted pixels in the composite image, in such a manner that the image from the specific camera will be least conspicuously patched into the general image. This "patch algorithm," determining the size and shape of the patch for the specific camera, can readily be turned into a list of which subset of pixels in the composite image are to be substituted with pixel signals from the specific camera. The means for determining the patch algorithm, and thus determining which pixel signals in the general camera output will be substituted with pixel signals from the selected specific camera, is shown as 104.

In a practical embodiment of the invention, replacement of pixels in the mosaic image with pixels from a specific camera will not be a simple one-for-one substitution. Because of the distortions involved in replacing a pixel from one camera with a pixel from another camera, the substituted pixel values can be derived from a function of multiple pixels from the specified camera image. The patch algorithm has to compute both the list of pixels to replace and a function to apply to the specific camera pixels to compute the replacement pixel values. For each replaced pixel, this function is generally a weighted sum of some set of pixels from the specific camera. This same technique can be applied when taking the mosaic camera images M1–M9 and fitting them into the overall image.

As can be seen in FIG. 3, for example, the individual mosaic screens M1–M9 are themselves in the form of distorted rectangles, the distortion in the illustrated rectangles being an artifact of the angular camera position relative to a center of the general scene. It will be evident that these artifacts must be taken into account in patch algorithms associated with each individual position of the mosaic camera M when it samples each mosaic screen such as M1–M9.

When the final composite image is created, that is the image comprising portions of each mosaic screen M1–M9 and at least one patched-in image from a specific camera such as S1 or S2, it will be evident that a central control system must take into account the relative position of each individual pixel in all of the mosaic screens and also in the particular patched-in image from a specific camera. A control system for managing the creation of the composite image will take into account both the relative positions of the mosaicing camera M and the selected specific camera S1 or S2, and also take into account the angular offset of the selected specific camera relative to the overall composite image from mosaicing camera M, so that the correct subset of pixels from the composite image from mosaic camera M can receive the substitute pixels from the selected specific camera. Because of the angular differences causing the distortion of the rectangles of each individual screen or patch, such a system will take into account the distortion of shape when selecting particular pixels for substitution.

Figure 5:
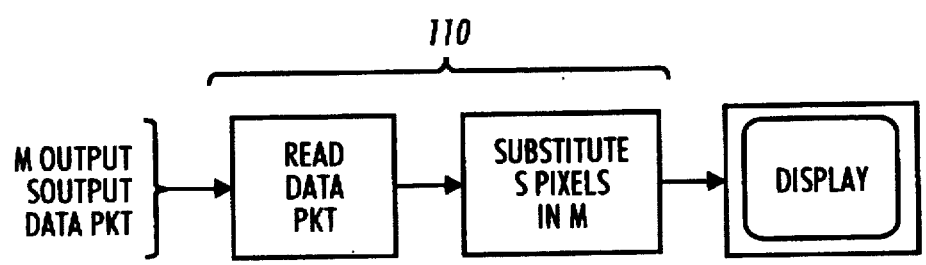
FIG. 5 is a systems diagram showing the functionality of a receiving station employed in one embodiment of the present invention.

FIG. 5 is a diagram showing the operation of a receiving station, indicated as 110, according to one embodiment of the present invention. Depending on the specific design of a system, the substitution of pixel signals from a specific camera into the pixel signals from the mosaicing camera may be performed either at the transmitter or at the receiver. If the substitution is performed at the receiver, the receiver should accept, as shown, signals from the mosaicing camera and the selected specific camera (these signals being in parallel or multiplexed as desired) and a data packet instructing which mosaicing camera pixel signals in the composite image should be replaced with specific camera pixel signals. Of course another design option which will be specific to a particular embodiment is whether the transmitter should send all of the pixel signals from the mosaicing camera (including those pixel signals which will be replaced with specific camera pixel signals) or should remove those pixel signals which will be replaced by specific camera pixel signals. The receiving station 110 recieves the streams of pixel signals and the data packet insturcting which pixels are to be subsituted, performs the substitution, and displays the final image. If the "patching" is desired to be performed at the sender, the video compression algorithm will need to be one that allows the sending of partial frame updates, by which the location of the patches will be encoded into the signal stream. If the reconstruction is at the receiver, the information about where the secondary camera images fit into the overall image is transmitted as additional data, along with other information about how to adjust for the perspective distortion.

Various techniques are known both in the art, and in the cross-referenced co-pending patent application "Device for Transcribing Images on a Board Using a Camera Based Board Scanner," to use motion-detection algorithms on the output of a camera to predict the motion of an object, such as a person, in the scene. For instance, if the person in the view of specific camera S1 moved his arm out of the range of the camera and into the area sampled by the general camera G only, for a noticeable amount of time the person's arm would "disappear" until general camera G took another sample. When the person moved his arm back into the range of the specific camera, the image of the arm that had been recorded by general camera G would appear to hang in space until general camera G took another sample. Techniques for detecting such anomalous behavior of a person or other object in the scene being recorded, such as by predicting motion outside of a range of a specific camera, can be adapted from known techniques and applied to the present invention. Once this anomalous behavior is detected, corrective actions may be provided, such as moving one or another specific camera to capture or "intercept" the motion in the scene.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method of transmitting an image representing a scene in real time, comprising the steps of:

a mosaicing camera sampling at least a first portion and a second portion of the scene, outputting a first mosaic image and a second mosaic image, each of the first mosaic image and the second mosaic image comprising a set of pixels forming a coherent image;

combining the first mosaic image and the second mosaic image whereby pixels from the first mosaic image abut pixels from the second mosaic image, yielding a coherent composite image;

a first specific camera sampling a first specific portion of the scene, outputting a first specific image, the first specific image including at least a portion of the scene sampled in the first mosaic image or the second mosaic image; and substituting pixels from the first specific image into the composite image, yielding a coherent final image.

2. The method of claim 1, further comprising the steps of
the mosaicing camera sampling each of the first portion and a second portion of the scene at a first frame rate; and the first specific camera sampling the first specific portion of the scene at a second frame rate different from the first frame rate.

3. The method of claim 1, further comprising the step of deriving a patch algorithm for the first specific camera, the patch algorithm including information relating to a position of the first specific camera relative to the composite image.

4. The method of claim 3, further comprising the step of selecting pixels in the composite image to be substituted with pixels from the first specific image, based on the patch algorithm.

5. The method of claim 1, further comprising the step of positioning the mosaicing camera in a periodic sequence of predetermined positions relative to the scene.

6. The method of claim 5, further comprising the step of deriving a patch algorithm for the mosaicing camera, the patch algorithm including information relating to a position of the mosaicing camera relative to the scene.

7. The method of claim 1, further comprising the steps of transmitting pixel signals relating to the composite image; and transmitting pixel signals relating to the first specific camera;

and wherein the the substituting step includes the step of substituting pixels from the first specific image into the composite image at a receiving station.

8. The method of claim 1, further comprising the steps of
a second specific camera sampling a second specific portion of the scene, outputting a second specific image, the second specific image including a least a portion of the scene sampled in the first mosaic image or the second mosaic image; and substituting pixels from the second specific image into the composite image, yielding a coherent final image.

9. The method of claim 8, further comprising the step of selecting the first specific image or the second specific image for substitution into the composite image.

10. The method of claim 9, further comprising the steps of detecting image motion in either the first specific portion of the scene or the second specific portion of the scene; and selecting the first specific image or the second specific image for substitution into the composite image depending on whether image motion is detected in either the first specific portion of the scene or the second specific portion of the scene.

11. The method of claim 9, further comprising the steps of
associating a microphone with each of the first specific portion of the scene or and second specific portion of the scene; and selecting the first specific image or the second specific image for substitution into the composite image depending on whether sound is detected by a microphone in either the first specific portion of the scene or the second specific portion of the scene.

12. An apparatus for transmitting an image representing a scene in real time, comprising:

a mosaicing camera adapted to sample at least a first portion and a second portion of the scene, outputting a first mosaic image and a second mosaic image, each of the first mosaic image and the second mosaic image comprising a set of pixels forming a coherent image;

means for combining the first mosaic image and the second mosaic image whereby pixels from the first mosaic image abut pixels from the second mosaic image, yielding a coherent composite image;

a first specific camera adapted to sample a first specific portion of the scene, outputting a first specific image, the first specific image including at least a portion of the scene sampled in the first mosaic image or the second mosaic image; and means for substituting pixels from the first specific image into the composite image, yielding a coherent final image.

13. The apparatus of claim 12, wherein the mosaicing camera is adapted to sample each of the first portion and a second portion of the scene at a first frame rate; and wherein the first specific camera is adapted to sample the first specific portion of the scene at a second frame rate different from the first frame rate.

14. The apparatus of claim 12, further comprising means for deriving a patch algorithm for the first specific camera, the patch algorithm including information relating to a position of the first specific camera relative to the composite image.

15. The apparatus of claim 14, further comprising means for selecting pixels in the composite image to be substituted with pixels from the first specific image, based on the patch algorithm.

16. The apparatus of claim 12, further comprising means for positioning the mosaicing camera in a periodic sequence of predetermined positions relative to the scene.

17. The apparatus of claim 16, further comprising means for deriving a patch algorithm for the mosaicing camera, the patch algorithm including information relating to a position of the mosaicing camera relative to the scene.

18. The apparatus of claim 12, further comprising a second specific camera adapted to sample a second specific portion of the scene, outputting a second specific image, the second specific image including a least a portion of the scene sampled in the first mosaic image or the second mosaic image;

means for substituting pixels from the second specific image into the composite image, yielding a coherent final image;

means for detecting image motion in either the first specific portion of the scene or the second specific portion of the scene; and means for selecting the first specific image or the second specific image for substitution into the composite image depending on whether image motion is detected in either the first specific portion of the scene or the second specific portion of the scene.

19. The apparatus of claim 12, further comprising a second specific camera adapted to sample a second specific portion of the scene, outputting a second specific image, the second specific image including a least a portion of the scene sampled in the first mosaic image or the second mosaic image;

means for substituting pixels from the second specific image into the composite image, yielding a coherent final image;

a microphone associated with each of the first specific portion of the scene or and second specific portion of the scene; and means for selecting the first specific image or the second specific image for substitution into the composite image depending on whether sound is detected by a microphone in either the first specific portion of the scene or the second specific portion of the scene.

* * * * *